Dec. 9, 1924.  1,518,445

V. W. PHELAN

MILK BUCKET ATTACHMENT

Filed Oct. 2, 1922

INVENTOR
Vincent W. Phelan
BY
ATTORNEY

Witness
Lynn Latta

Patented Dec. 9, 1924.

1,518,445

UNITED STATES PATENT OFFICE.

VINCENT W. PHELAN, OF FARRER, IOWA.

MILK-BUCKET ATTACHMENT.

Application filed October 2, 1922. Serial No. 591,799.

*To all whom it may concern:*

Be it known that I, VINCENT W. PHELAN, a citizen of the United States, and a resident of Farrer, in the county of Polk and State of Iowa, have invented a certain new and useful Milk-Bucket Attachment, of which the following is a specification.

The object of my invention is to provide a milk bucket attachment of simple, durable, and comparatively inexpensive construction.

More particularly, my invention relates to an attachment adapted to be placed upon a milk bucket or the like so that the bucket may be supported between the legs of a person when milking.

Still another object is to provide such an attachment wherein it may be easily secured on a milk bucket and may be quickly removed therefrom when desired.

Still a further object is to provide such an attachment which can be easily adjusted to operate upon milk buckets of various sizes.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1:
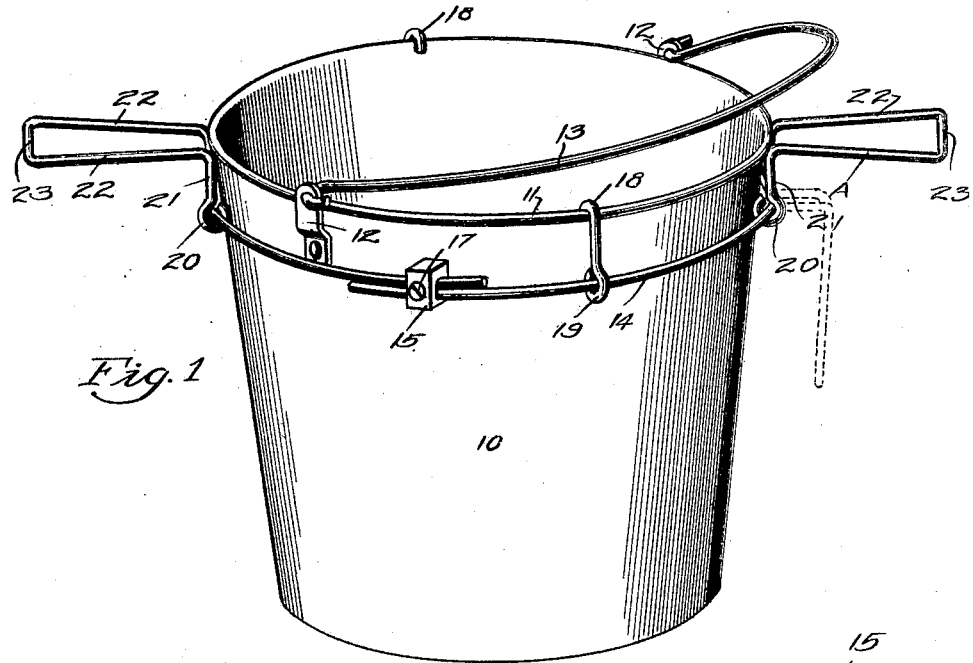
Figure 1 is a perspective view of my milk bucket attachment shown on a milk bucket, one of the positions of the supporting brackets being shown in dotted lines.
Figure 3:
Figure 3 is a detail, sectional view taken through the block for locking the ends of the hoop together.
Figure 2:
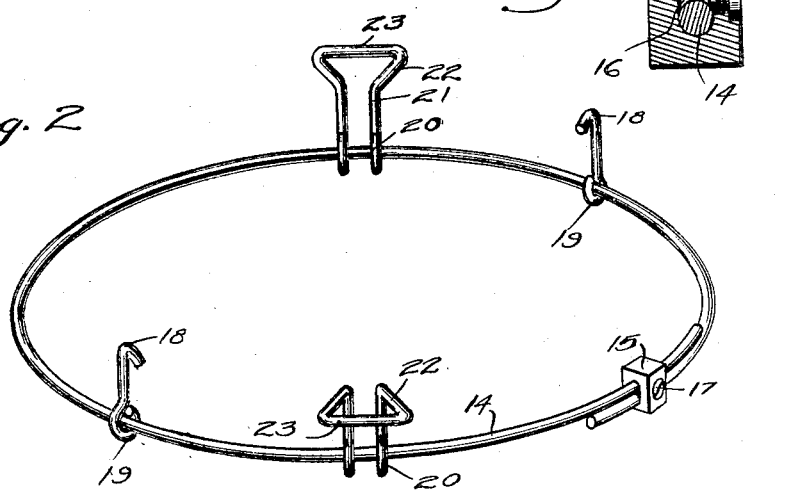
Figure 2 is a perspective view of the attachment itself.

In the accompanying drawings, I have used the reference numeral 10 to indicate generally, a milk bucket which has its upper edge formed with a bead 11. The bucket 10 is provided with a pair of ears 12 for receiving the ends of the ordinary bail or handle 13.

My attachment includes a hoop 14 which is formed of wire and has its ends extended through the block member 15. The block member 15 is provided with an elongated opening 16, through which the ends of the hoop 14 are extended.

In order to lock the ends of the hoop 14 against any movement, I provide the set screw 17. The set screw 17 is so arranged that when it is in locked position, it will engage both of the ends of the hoop 14 for preventing any movement thereof. From the construction of the parts just described, it will be seen that the hoop 14 may be adjusted to various sizes.

In order to properly support the hoop 14 on the bracket 10, I provide the hook members 18. The hook members 18 are formed with loops 19 on the lower ends, which receive the hoop 14. The upper end of the hook members 18 are extended over the bead 11 of the bracket 10, and thus support the hoop 14.

A pair of supporting brackets A are pivotally mounted on the hoop 14, as will now be described in detail. Each of the supporting brackets A are formed of a strand of wire which is bent so as to form a yoke or U-shaped structure. The ends of the strand of wire forming the brackets A have loops 20 on their lower ends, through which loops the hoop 14 is extended. The wire is then extended upwardly along the sides of the bucket 10 so as to provide the portions 21.

Just below the bead 11 of the bracket 10, I bend the strand of wire forming the supporting brackets A so as to provide the horizontal portion 22. The portion 22 is arranged at substantially right angles to the portion 21. The ends of the portions 22 are connected together as at 23.

From the construction of the parts just described, it will be seen that when the bracket is placed between the legs of the milker, it can be supported by the portion 22 of the supporting brackets A resting on the legs.

The portions 21, abutting against the milk bucket 10, will cause the supporting brackets to operate successfully. When the supporting brackets are not needed, they will swing of their own accord to the position shown in dotted lines in the drawings.

When it is desired to remove the attachment from the milk bucket, all that is necessary is to slightly raise the hoop 14 so that the hook members 18 may be disconnected from the upper edge of the bucket and the entire attachment will then drop down out of the way.

It will be seen that the providing of a complete attachment for operation on buckets of various sizes is quite an advantage over any permanent fixture on the bucket. It will be seen also that my attachment may be removed for permitting the bucket to be much more easily cleaned.

It will also be seen that if desired, the attachment can be left upon the bucket and the supporting brackets will swing down along the side of the bucket and out of the way.

Some changes may be made in the construction and arrangement of the various parts of my invention, without departing from the real spirit and purpose of my invention and it is my intention to cover by my claim, any modified forms of structure or use of mechanical equivalents, which may be reasonably included within their scope.

I claim as my invention:

A device of the class described adapted to be used in combination with a milk bucket comprising a wire hoop arranged to encircle the bucket near the upper end thereof and to be of greater length than the circumference of the bucket, a block member having an opening therein arranged to receive the ends of the said wire hoop, a set screw arranged in the side of said block member and adapted to coact with both of the ends of said wire for locking said wire hoop against any spreading movement and for retaining the wire in proper position, a pair of wire hook members having eyelets on one end mounted on said wire hoop and arranged to have their hook end extend over the upper edge of the bucket for supporting the hook adjacent the upper edge of the bucket, a pair of wire brackets, each of said brackets being formed of a single piece of metal having eyelets on its ends through which is extended the wire hoop, each of said brackets being formed with a pair of knees adapted to rest against the side of the bucket and a pair of spaced supporting arms arranged at right angles to the knees abutting against the bucket for serving as brackets to support the bucket as and for the purposes stated.

Des Moines, Iowa, September 22, 1922.

VINCENT W. PHELAN.